US008793890B2

(12) United States Patent
Delneo et al.

(10) Patent No.: US 8,793,890 B2
(45) Date of Patent: Aug. 5, 2014

(54) TAPE RULE HOUSING

(75) Inventors: John Delneo, Middletown, CT (US);
John C. Murray, Canton, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 233 days.

(21) Appl. No.: 13/368,756

(22) Filed: Feb. 8, 2012

(65) Prior Publication Data

US 2012/0260514 A1    Oct. 18, 2012

Related U.S. Application Data

(60) Provisional application No. 61/475,121, filed on Apr. 13, 2011.

(51) Int. Cl.
*G01B 3/10*    (2006.01)

(52) U.S. Cl.
USPC ............................................ 33/769

(58) Field of Classification Search
USPC ............................................ 33/769
See application file for complete search history.

(56) References Cited

U.S. PATENT DOCUMENTS

| | | | |
|---|---|---|---|
| 4,131,530 A | 12/1978 | Blum et al. | |
| 4,215,829 A * | 8/1980 | Boyllin | 242/375 |
| 4,527,334 A | 7/1985 | Jones et al. | |
| 4,907,348 A * | 3/1990 | Hubbard, Jr. | 33/767 |
| 4,911,811 A | 3/1990 | Mullaney, Jr. | |
| 4,931,366 A | 6/1990 | Mullaney, Jr. | |
| 5,400,520 A * | 3/1995 | Hillinger | 33/761 |
| 5,459,942 A * | 10/1995 | Hintz, Jr. | 33/768 |
| 5,746,004 A | 5/1998 | Wertheim | |
| 6,243,964 B1 * | 6/2001 | Murray | 33/769 |
| 6,324,769 B1 | 12/2001 | Murray | |
| 6,807,747 B1 | 10/2004 | Hsu | |
| 6,857,198 B1 | 2/2005 | Lin | |
| 6,889,405 B2 | 5/2005 | Ritrovato et al. | |
| D507,197 S | 7/2005 | Sun | |
| 7,007,401 B1 | 3/2006 | Lin | |
| 7,100,300 B2 | 9/2006 | Knight et al. | |
| 7,250,194 B2 | 7/2007 | Aversenti et al. | |
| D579,359 S | 10/2008 | Critelli et al. | |
| D613,629 S | 4/2010 | Suzuki | |
| 7,726,039 B2 | 6/2010 | Lee et al. | |
| 2002/0028301 A1 | 3/2002 | Popoola et al. | |
| 2003/0101853 A1 | 6/2003 | Mai | |
| 2003/0204966 A1 | 11/2003 | Hsu | |
| 2003/0233762 A1 | 12/2003 | Blackman et al. | |
| 2005/0028397 A1 | 2/2005 | Blackman et al. | |
| 2007/0207310 A1 | 9/2007 | Storey | |
| 2007/0227029 A1 * | 10/2007 | Shute et al. | 33/761 |
| 2008/0067075 A1 | 3/2008 | Zia | |
| 2009/0229430 A1 | 9/2009 | Siegel et al. | |
| 2011/0099828 A1 * | 5/2011 | Hernandez | 33/757 |
| 2011/0179661 A1 | 7/2011 | Delneo et al. | |
| 2011/0179664 A1 | 7/2011 | Delneo et al. | |
| 2013/0025148 A1 * | 1/2013 | Steele et al. | 33/769 |
| 2013/0232806 A1 * | 9/2013 | Chapin et al. | 33/769 |

* cited by examiner

*Primary Examiner* — Christopher Fulton
(74) *Attorney, Agent, or Firm* — Pillsbury Winthrop Shaw Pittman LLP

(57) ABSTRACT

A tape rule includes a housing comprising a first material, a reel rotatable within the housing, an axle extending within the housing about which the reel is mounted, a measuring tape wound on the reel, and a reinforcement region comprising a portion of the housing. The reinforcement region is formed from a second material having a higher impact resistance material than the first material of the housing. The second material is disposed at least at a position at which the axle joins the housing.

20 Claims, 13 Drawing Sheets

TAPE RULE HOUSING

BACKGROUND

This application claims priority and benefit under 35 U.S.C. §119(e) to U.S. Provisional Patent Application No. 61/475,121, filed on Apr. 13, 2011. The content of that application is incorporated herein in its entirety by reference.

Field

The present disclosure relates to rule assemblies.

A typical tape rule assembly includes an elongated thin metal rule blade or measuring tape that is mounted on a reel rotatably disposed within a housing. The rule blade is retracted into the housing for storage by coiling it about the reel. To measure a work-piece or distance, a length of the rule blade is pulled out of the housing to span the work-piece or distance to be measured so that gradation lines and/or numbers printed on the blade can be read. To measure a distance between two objects or surfaces, a blade hook at the free end of the blade may be temporarily secured or placed against an object or surface.

The present disclosure provides several improvements over the prior art.

SUMMARY

One aspect of the present disclosure provides a tape rule that includes a housing comprising a first material, a reel rotatable within the housing, an axle extending within the housing about which the reel is mounted, a measuring tape wound on the reel, and a reinforcement region comprising a portion of the housing. The reinforcement region is formed from a second material having a higher impact resistance material than the first material of the housing. The second material is disposed at least at a position at which the axle joins the housing.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated can be considered are drawn to scale. It is to be expressly understood, however, that the drawings are for the purpose of illustration and description only and are not intended as a definition of the limits of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION OF THE DRAWINGS

Figure 1:
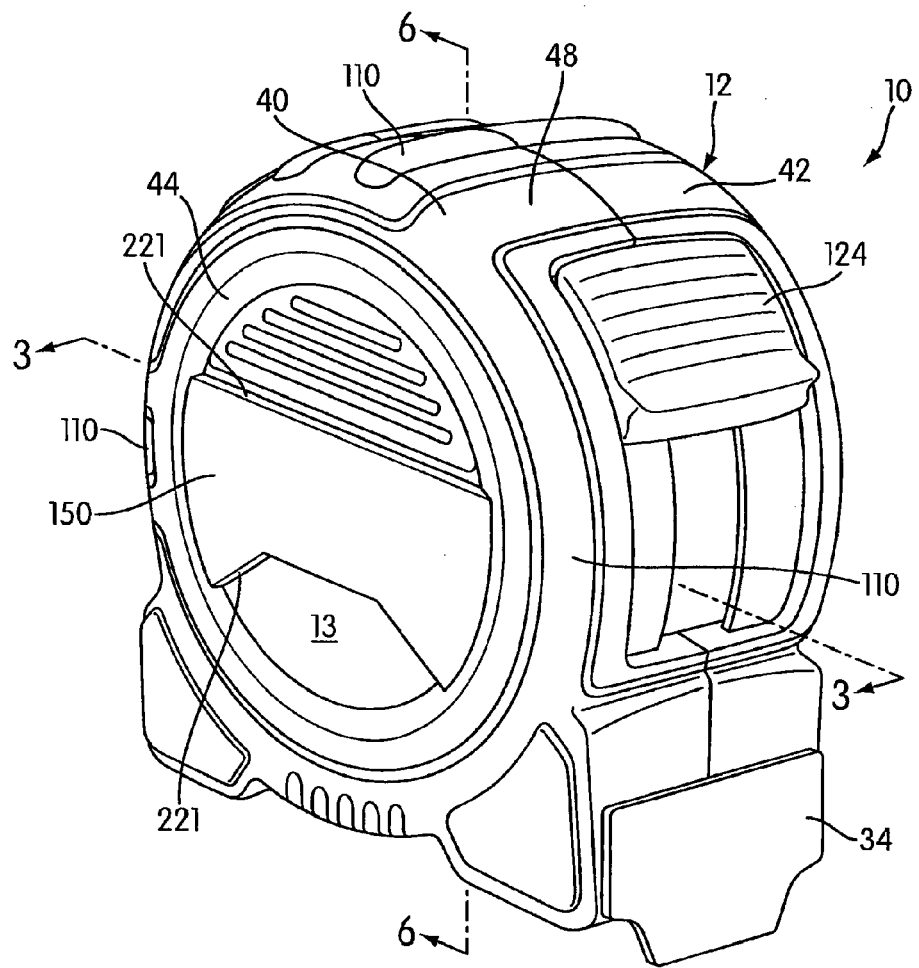
FIG. 1 shows a perspective view of a tape rule assembly in accordance with an embodiment of the present disclosure.

FIGS. 1-8 show a tape rule assembly 10 in accordance with an embodiment of the present disclosure. The tape rule assembly 10 includes a housing 12 comprising a first material 13, a reel 14 rotatable within the housing 12, an axle 15 extending within the housing 12 about which the reel 14 is mounted, a measuring tape 16 wound on the reel 14, and a reinforcement region 150 comprising a portion of the housing 12. The reinforcement region 150 is formed from a second material having a higher impact resistance material than the first material 13 of the housing 12. The second material is integrally formed with the first material and disposed at least at a position 17 at which the axle 15 joins the housing 12.

The housing 12 is made in part of the first material. In one embodiment, the first material may be a molded plastic material. In another embodiment, the first material may be an Acrylonitrile Butadiene Styrene (ABS) plastic material. In yet another embodiment, the first material may include an injection molding grade, platable ABS. In such embodiment, the first material is formulated to injection molding grade, platable. In one embodiment, the first material may be any suitable material that can chemically bond with the second material of the reinforcement region 150.

Figure 3:
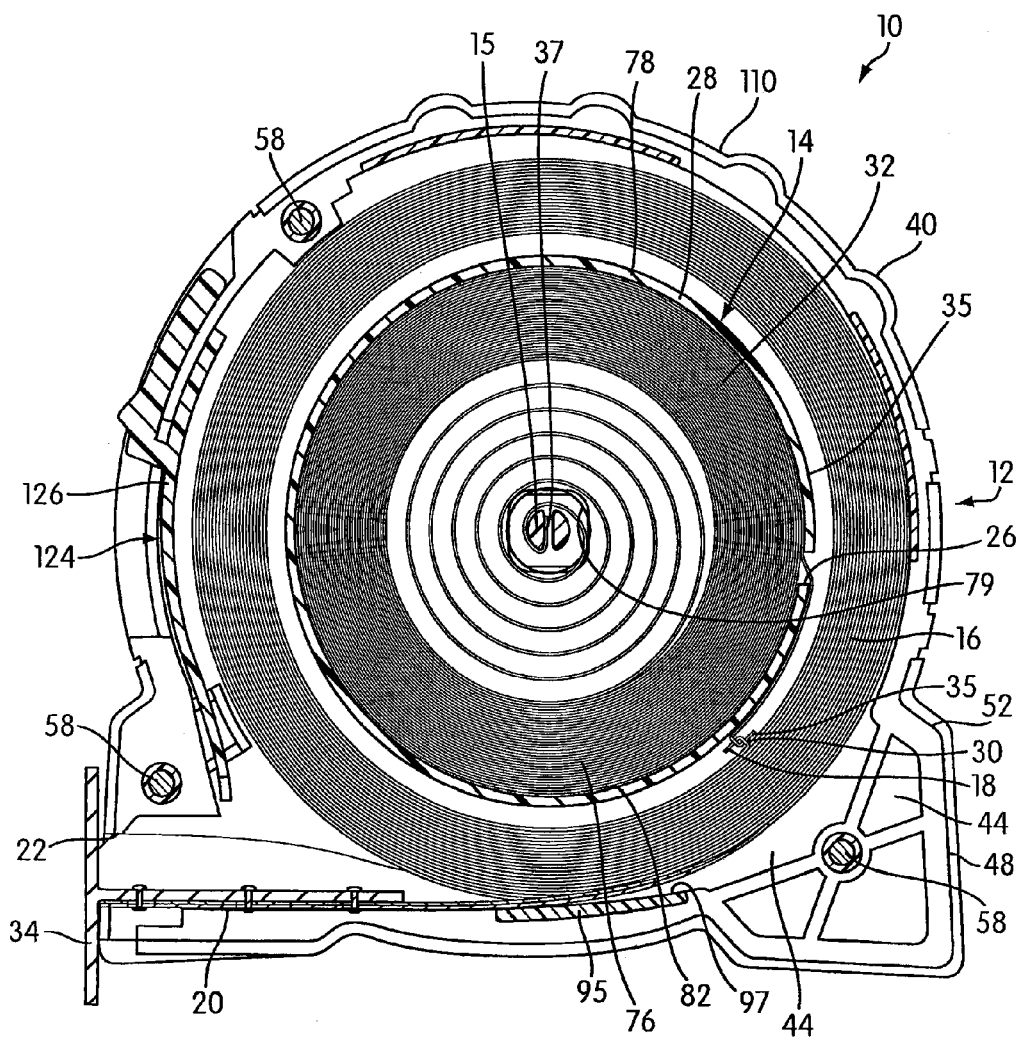
FIG. 3 shows a cross-sectional view of the tape rule assembly taken through the line 3-3 in FIG. 1 showing a blade thereof in a fully retracted configuration in accordance with an embodiment of the present disclosure.
Figure 4:
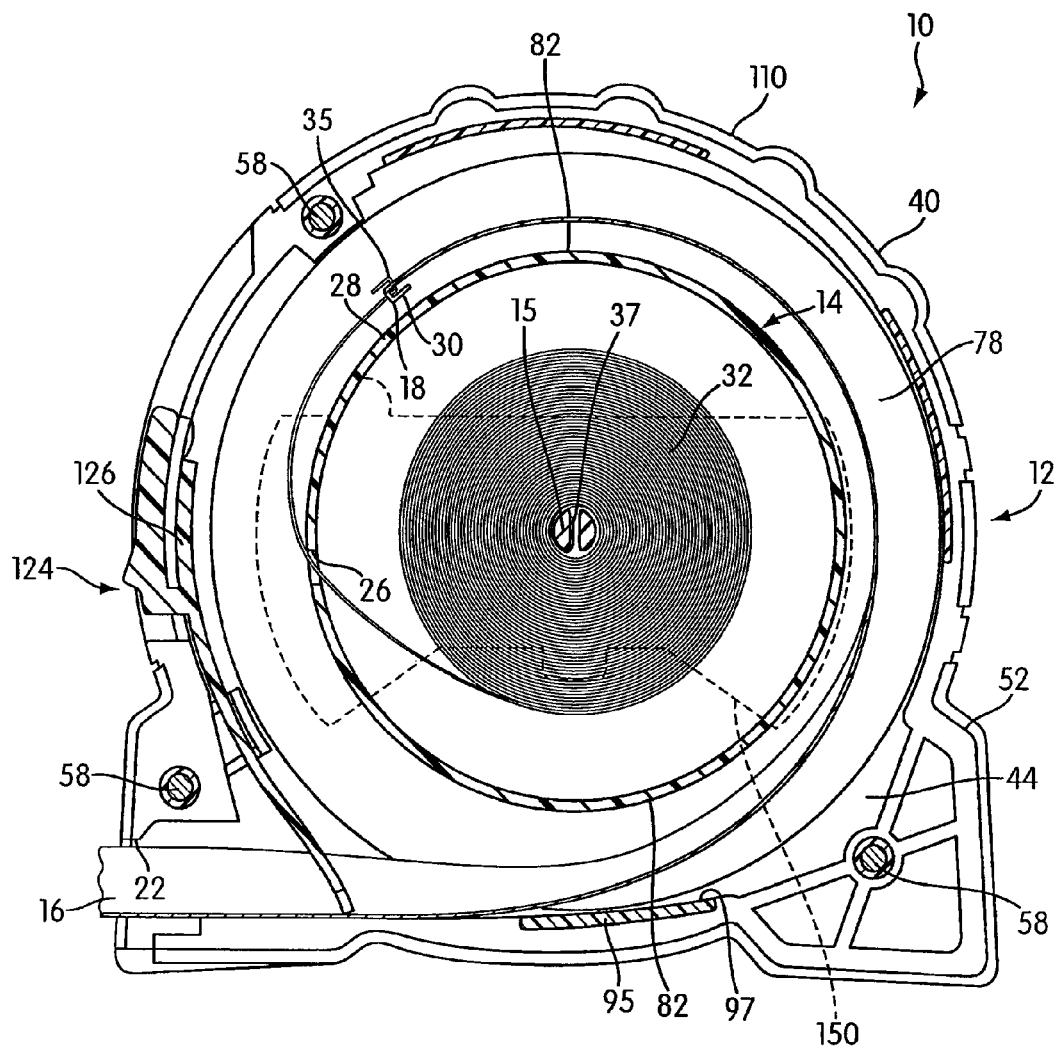
FIG. 4 is a view similar to FIG. 3 except showing the blade in a fully extended configuration in accordance with an embodiment of the present disclosure.
Figure 5:
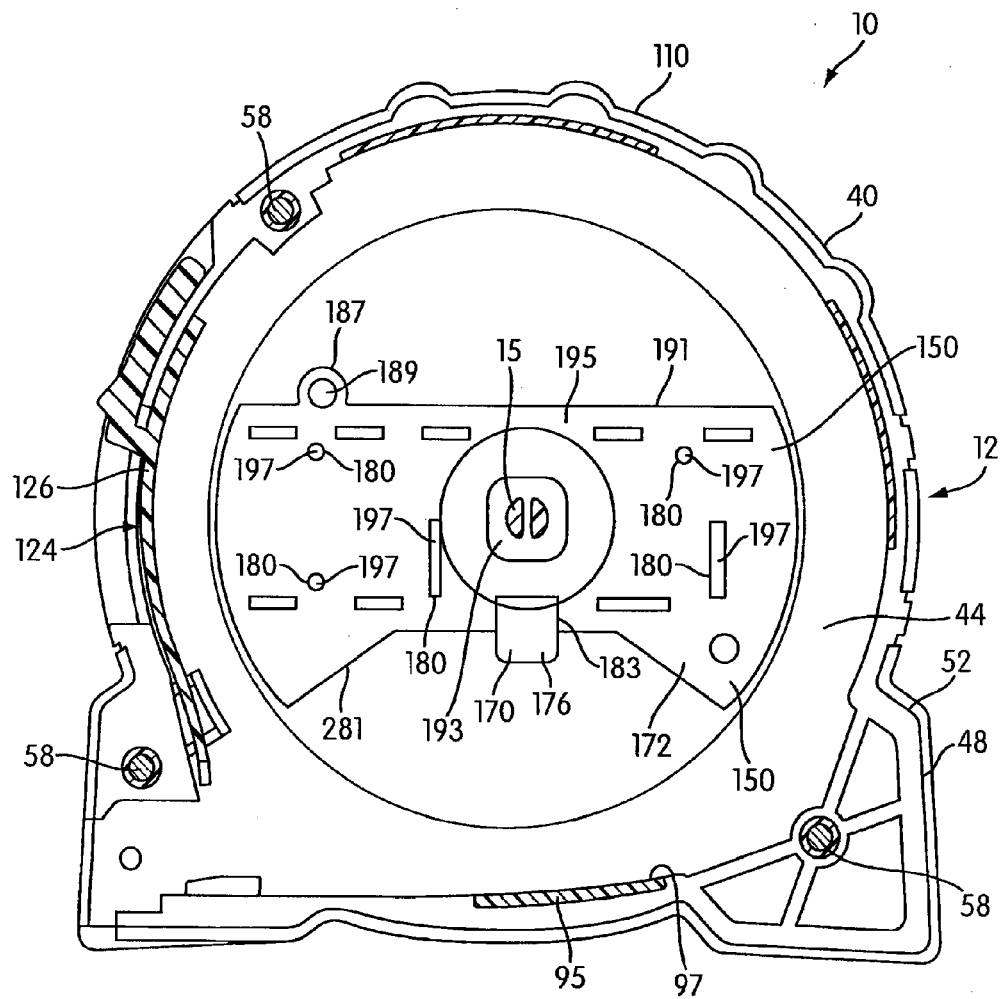
FIG. 5 is a view similar to FIG. 3, where reel, retraction or return spring and measuring tape of the tape rule housing are not illustrated for sake of clarity, in accordance with an embodiment of the present disclosure.
Figure 6:
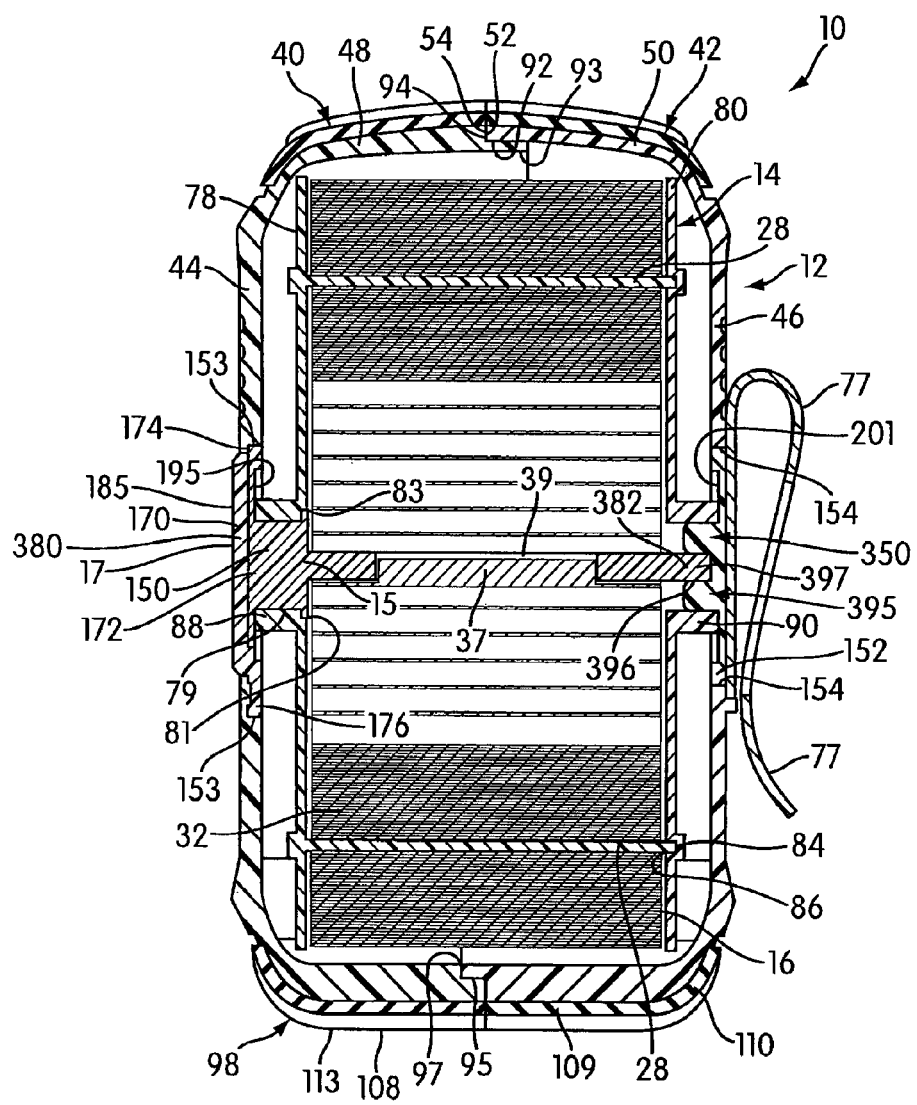
FIG. 6 is a cross-sectional view taken through the line 6-6 in FIG. 1.
Figure 7:
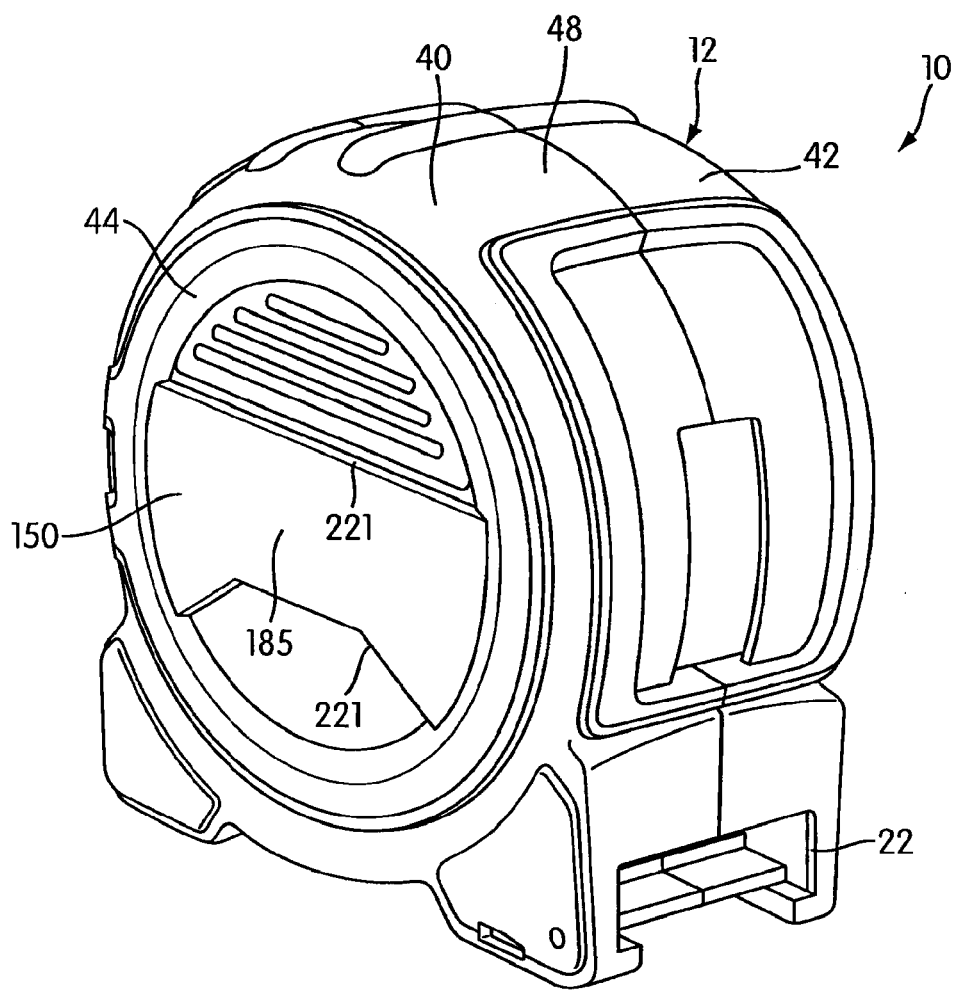
FIG. 7 shows a front perspective view of the tape rule housing (without grip portions) in accordance with an embodiment of the present disclosure.
Figure 8:
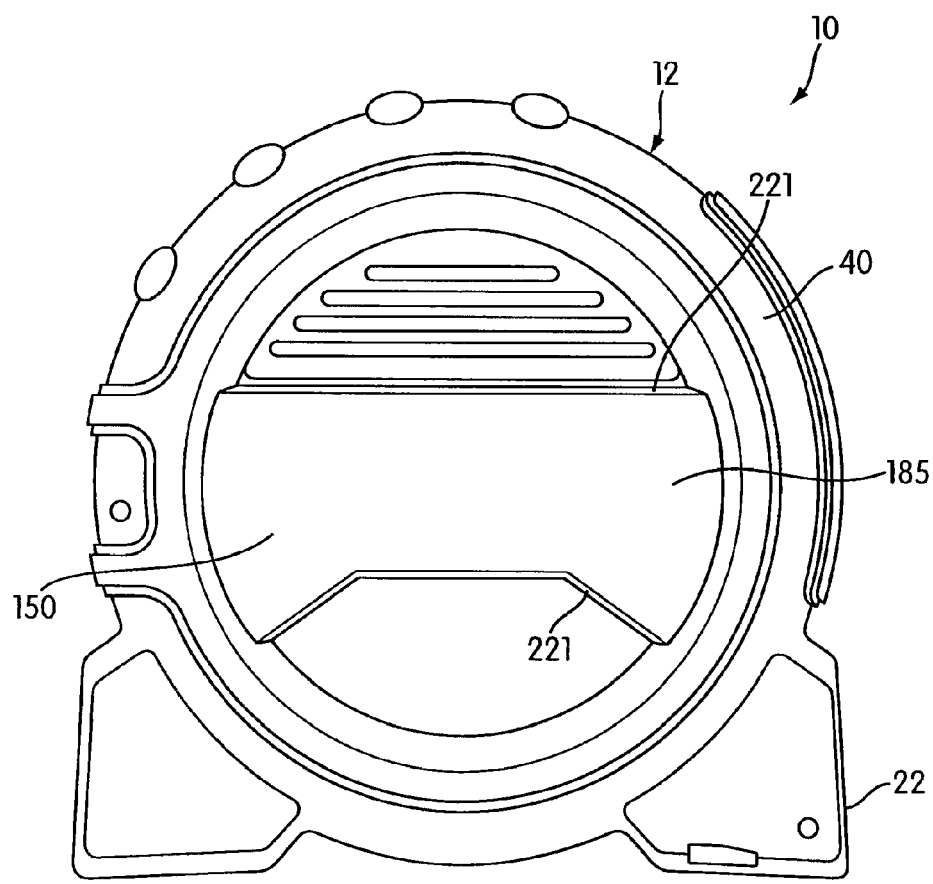
FIG. 8 shows a front view of the tape rule housing of FIG. 7.

In one embodiment, the housing 12 is constructed to easily and comfortably fit in a hand of the user and houses the measuring tape or blade 16, a retraction or return spring 32 (as shown in FIGS. 3, 4 and 6) and other cooperating components. The details of the internal structure of the housing 12 and the measuring tape or blade 16 mounted therein are shown in FIGS. 3, 4 and 6.

As shown in FIG. 6, the housing 12 includes a pair of cooperating housing members 40, 42. Each housing member 40, 42 includes an end wall 44, 46, respectively, and a peripheral wall 48, 50, respectively, extending from a periphery of the end walls and terminating in a free edge 52, 54, respectively. The pair of cooperating housing members 40, 42 are joined to one another in cooperating relation to define the housing 12.

When the housing members 40, 42 are fixed together in the assembled rule assembly 10, the free edges 52, 54 are interengaged as shown in FIG. 6. As shown in FIGS. 3 and 4, a plurality of axially extending fasteners 58 extend through one of the housing members 42 and threadedly engage the other housing member 40 at spaced positions in the respective end walls 44, 46 adjacent the peripheral walls 48, 50.

The housing members 40, 42 may include portions along the abutting free edges thereof 52, 54, respectively, of tongue and groove construction (FIG. 6) to help secure the housing members 40, 42 of the assembled rule assembly 10 together. In one embodiment, at a top portion of the housing 12, a wall portion 92 formed near edge 54 is received within a recess 94 formed along a portion of the edge 52. An integral wall portion 93 formed on the peripheral wall 48 is disposed in underlying, abutting relation to the wall portion 50 of the housing member 42. At a bottom portion of, the housing 12, a wall portion 95 formed on the peripheral wall 50 is received within a recess 97 formed on a portion of the peripheral wall 48 of housing member 40.

In one embodiment, the end walls 44, 46 of the housing members 40, 42 may include connecting regions 153, 154, respectively. The connecting regions 153, 154 are disposed near a position at which the reel spindle or axle 15 joins the housing 12. These connecting regions 153, 154 can, in one embodiment, take the form of recesses or openings in the end walls 44, 46 that are configured to receive reinforcement regions 150, 152, respectively, therein.

The housing 12 includes two corner portions (see FIG. 2, for example) 96, 98. One corner 96 is adjacent a housing opening 22 (FIGS. 2-4) and the other corner portion 98 is at an opposite bottom end of the housing 12. The two bolts 58 are positioned near the two corner portions 96, 98, respectively, of the housing 12 and one other bolt 58 is positioned in a peripheral top portion of the housing 12.

A clip 77 may be secured to one side of the housing 12 by fasteners (not shown). The clip 77 can be used to attach the rule assembly 10 to the belt of a user, or other attachment point. In one embodiment, the belt clip 77 is made from, for example, a metal material.

A peripheral portion of housing 12 is provided with grip portions 110 to provide increased frictional engagement between the housing 12 and a user's hand and to provide a relatively soft comfortable surface for the user's hand. In one embodiment, the grip portions 110 include, for example, an overmolded rubber material or a rubber-like (polymeric) material.

In one embodiment, at least portions of the exterior surface of the housing 12 (e.g., exterior surface portions that are not covered with the grip portions) are provided with (decorative) metal coating using any known metal plating process. In one embodiment, the plating material is deposited only on the first material of the housing 12. In one embodiment, the plating material, when deposited, does not adhere to the second material of the reinforcement region 150.

In one embodiment, the first material of the housing 12 and the second material of the reinforcement region 150 are first formed or molded together. This (entire) formed or molded assembly is then subjected to any known metal plating process. After the metal plating process, the plating material is deposited is only on the first material of the housing 12, as it does not adhere to the second material of the reinforcement region 150. Since the plating material is not adhered to the second material of the reinforcement region 150, the reinforcement region 150 may be used as a label or display surface having a differently colored (in comparison to the plating color) advertising, trademark, or promotional information thereon.

As can be appreciated from FIGS. 3 and 4, the reel 14 is rotatable in the housing 12 and the measuring tape 16 is wound on the reel 14. The reel 14 is mounted in the housing 12 by the axle or reel spindle 15.

As seen in FIG. 3, in one embodiment, the reel 14 is made from, for example, a molded plastic material. In another embodiment, the reel 14 is made from, for example, an Acrylonitrile Butadiene Styrene (ABS) plastic material.

In one embodiment, the reel 14 is provided with a slot or an opening 26 in a central cylindrical wall portion 28 thereof. One end 18 of the blade 16 terminates in a hook-like structure 30 that engages a first longitudinal end 35 of the return spring 32 to connect the end 18 of the blade 16 to the return spring 32 (FIGS. 3, 4).

The reel 14 includes two reel members 78, 80 (FIG. 6) that provide circular side walls and cylindrical wall portion or hub 28 about which the blade or measuring tape 16 is wound.

In one embodiment, each reel member 78, 80 includes an outwardly extending cylindrical wall portion 88, 90, respectively, formed at least near a position at which the reel spindle or axle 15 joins the housing 12. In one embodiment, an annular edge portion 84 on the wall portion 82 is received within an annular groove 86 formed within the reel member 80 to help hold the reel 14 together, although other areas and types of connections are contemplated. The abutting engagement of the wall portions 88, 90 on the reel 14 with the rear surfaces 195, 201 of the reinforcement portions 150, 152 maintain the edge portion 84 within the groove 86 in the assembled rule assembly 10.

The axle or reel spindle 15 extends within the housing 12. The reel 14 is rotatably mounted on the axle or reel spindle 15. In various embodiments as described herein, the spindle 15 may be integrally formed with the reinforcement region 150. Thus, for example, the spindle 15 and the reinforcement region 150 may be integrally molded as one piece. In another embodiment, the spindle 15 may be formed separately from a different material than the reinforcement region 150. In that case, the spindle 15 can be connected with the reinforcement region 150 in various manners, such as by being inserted into a die and having the reinforcement region 150 molded and attached to the spindle 15, or the spindle 15 can be mechanically connected to the reinforcement region 150 after the reinforcement region 150 is formed.

In the embodiment of FIG. 6, each end of the spindle 15 extends through a hole 79 of circular cross-section formed in opposite sides of the reel 14. The portions of the spindle 15 that extend through the holes 79 in the reel 14 have cylindrical outer surfaces. A flange 81 on the spindle 15 engages an annular groove 83 in the reel 14 surrounding the hole or opening 79 to guide the rotation of the reel on the spindle. Thus, the reel 14 is rotatably mounted on the spindle 15 for bi-directional rotational movement of the reel 14. In one embodiment, a longitudinal end 37 of the retraction spring 32 hookingly engages with the spindle 15.

Figure 15:
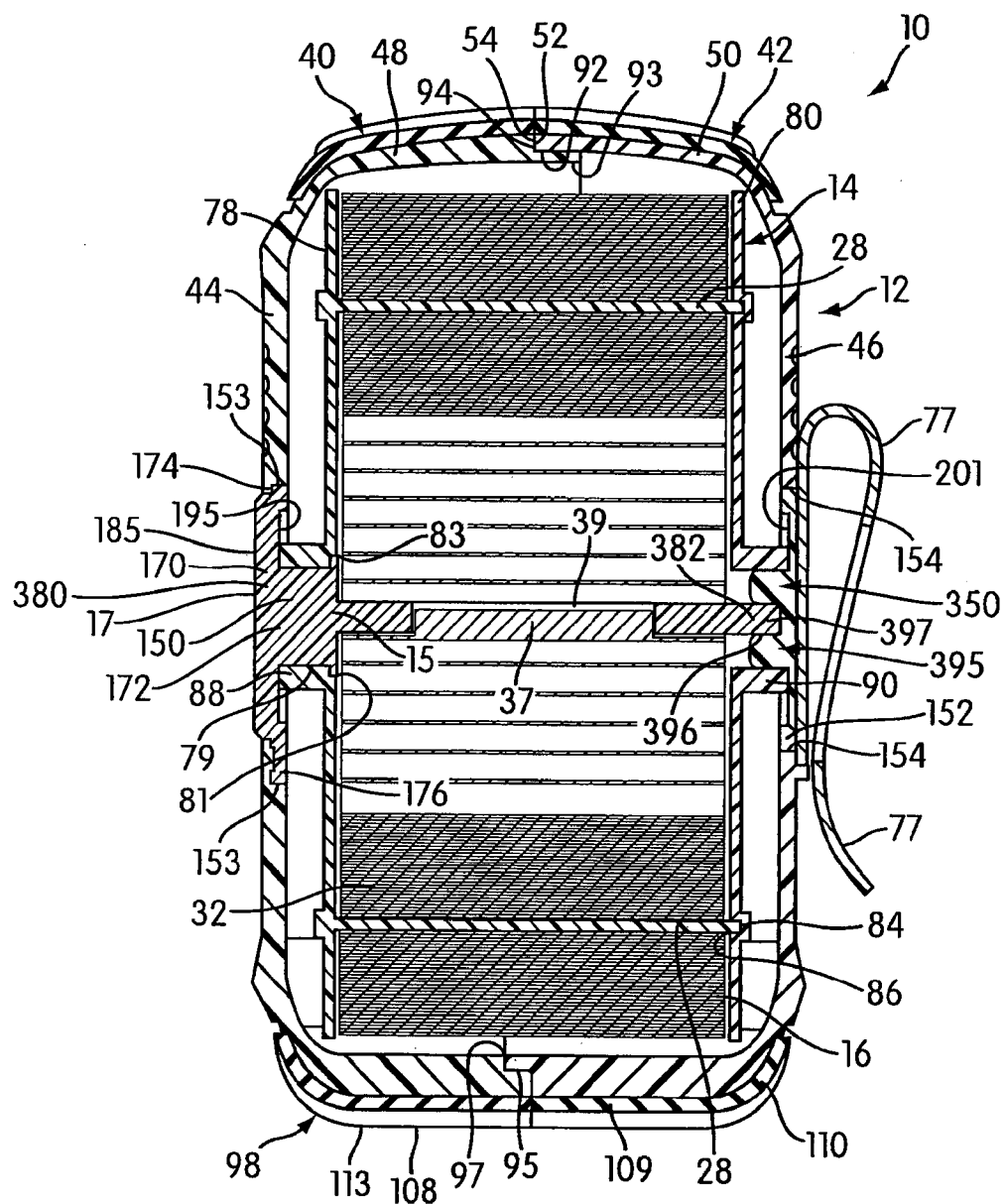
FIG. 15 shows a cross-section view of a tape rule housing in accordance with another embodiment of the present disclosure, where axle of the tape rule housing is integrally formed or molded as one single piece with reinforcement region.

In one embodiment, the axle or reel spindle 15 is formed from the same second material as the reinforcement region 150, which is different from the first material of a portion of the housing 12, and is molded into (e.g., by insert molding) the reinforcement region 150. In another embodiment, as shown in FIG. 15, the spindle or axle 15 may be integrally formed or molded as one piece with the reinforcement region 150.

Figure 14:
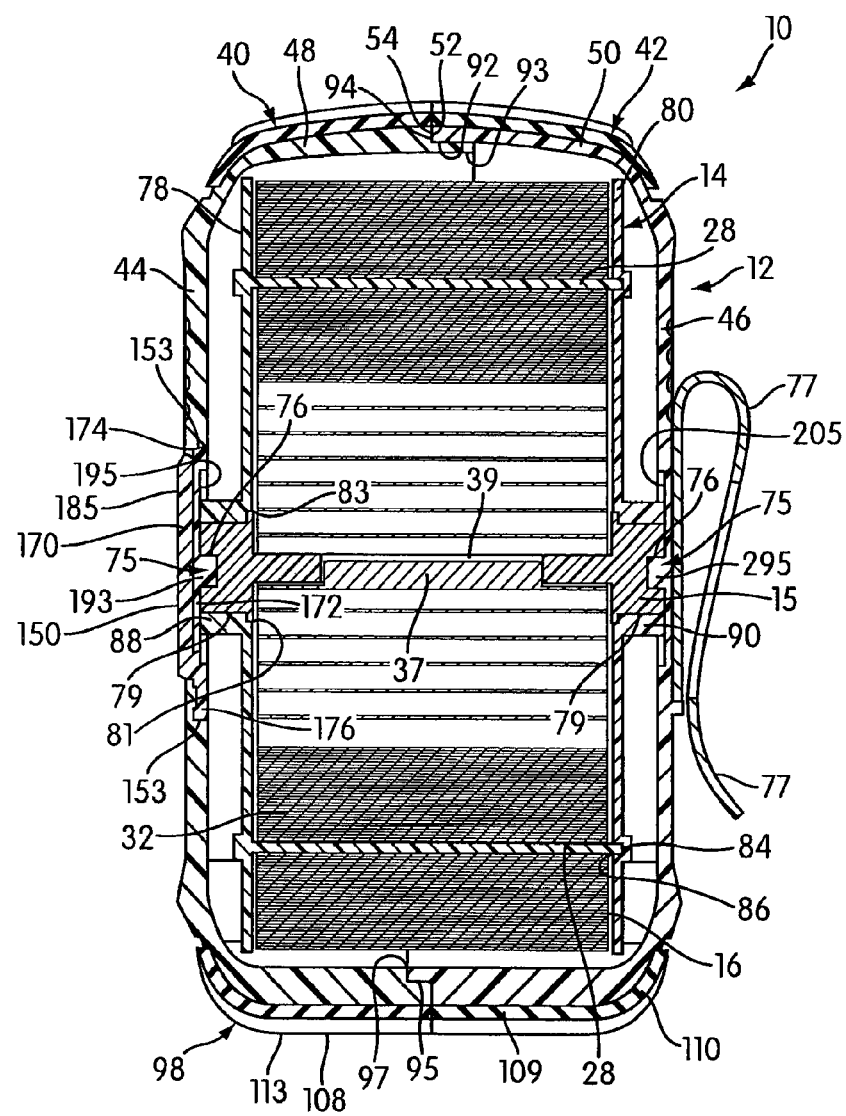
FIG. 14 shows a cross-section view of a tape rule housing in accordance with another embodiment of the present disclosure, where the reinforcement region includes a mounting structure and the axle of the tape rule housing is joined to the mounting structure.

In another embodiment, as shown in FIG. 14, the reinforcement regions 150, 152 include posts or mounting structures 193, 295, respectively. The reinforcement regions are molded or otherwise attached with the first material of the housing 12. The axle or reel spindle 15 is joined to the mounting structures 193, 295. In such an embodiment, the spindle 15 can be constructed of, for example, a molded plastic material, a nylon material, a metal material, ABS, or polycarbonate. It should be appreciated that in the desired embodiments, the housing region at which the spindle or axle 15 joins or meets the housing 12 is formed of the second, higher impact resistant materials. This provides strong support for the connection or meeting region between the spindle and the housing.

In one embodiment, the axle or reel spindle 15 is integrally molded with the reinforcement region 150 using injection molding process, such as, insert injection molding or multi-shot (e.g., two-shot) injection molding process.

Referring to FIG. 6, the axle or reel spindle 15 is formed from the second material and is molded into (e.g., by insert molding) the reinforcement region 150 on a first end 380. At opposite end 382, the fixed spindle or axle 15 has an interengaging recess-projection connection 350 (shown in FIG. 6) with the reinforcement region 152. In one embodiment, the spindle or axle 15, at the second end 382, may be attached to the reinforcement portion 152 using any suitable attachment mechanisms known in the art such as fasteners, friction fit, interference fit, adhesive bonding, welding, etc. As discussed above, the reinforcement regions 150, 152 are disposed in the recesses or openings 153, 154 of the end walls 44, 46 of the housing 12 and are integrally molded with the end walls 44, 46 of the housing 12. As also discussed above, the spindle or axle 15 may optionally be integrally molded with the reinforcement regions.

In the embodiment of FIG. 6, a mounting structure 395 having a recess or an opening 396 is integrally formed on a rear surface 201 of the reinforcement portion 152 and is configured to receive an end portion 397 formed on the opposite end 382 of the spindle 15. The reel spindle or axle 15 forms an interengaging recess-projection connection 350 at the opposite end 382 with the reinforcement region 152 disposed in the opening 154 of the end wall 46 of the housing 12. The integrally formed fixed end and recess-projection connection 350 at the proximal end of the spindle 15 together prevent rotation of the spindle 15 with respect to the housing 12 when the spindle 15 is mounted in the assembled rule assembly 10.

FIG. 14 shows a cross-section view of a tape rule housing in accordance with another embodiment of the present disclosure, where the reinforcement regions 150, 152 include posts or mounting structures 193, 295, respectively, and the axle or spindle 15 is joined at opposite ends with these posts or mounting structures.

Referring to FIG. 14, the fixed spindle or axle 15 has a noncircular interengaging recess-projection connection 75 (shown in FIG. 14 and described below) at each end thereof generally with the reinforcement regions 150, 152, respectively, disposed in the openings 153, 154 of the end walls 44, 46 of the housing 12. In one embodiment, the spindle or reel 15 may be attached to the reinforcement portions 150, 152 using any suitable mechanical attachment mechanisms known in the art such as fasteners, friction fit, interference fit, adhesive bonding, welding, etc. For example, in one embodiment, each end of the fixed spindle 15 is interiorly threaded to threadedly receive fasteners or bolts therein. The fasteners or bolts extend through the reinforcement regions 150, 152 and threadedly engage internal threading in each end of the spindle 15. That is, each bolt or fastener extends through the recess-projection connection 75, when each bolt or fastener is disposed in the reinforcement region and the spindle.

The construction of the recess-projection connections 75 between the ends of the spindle 15 and the rear surfaces 195, 201 of the reinforcement portions 150, 152 is shown in the cross-sectional view in FIG. 14. Each recess-projection connection 75 is identical.

In one embodiment, mounting structures 193, 295 having exterior noncircular cross-sections are integrally formed on the rear surfaces 195, 201 of the reinforcement portions 150, 152 and are received within recesses 76 having complementary non-circular interior cross-sections formed on each end of the spindle 15. The noncircular interior and exterior cross-sections cooperate to prevent rotation of the spindle 15 with respect to the housing 12 when the ends of the spindle 15 are mounted on the mounting structures 193, 295 in the assembled rule assembly 10.

The retraction spring 32 is constructed and arranged between the housing 12 and the reel 14 to rotate the reel 14 with respect to the housing 12 in a direction to wind the elongated blade 16 about the reel 14 into the housing 12. The retraction spring 32 is generally enclosed within the central wall portion 28 of the reel 14 (FIGS. 3, 4 and 6). The first longitudinal end 35 of the retraction spring 32 extends through the opening 26 and engages the first longitudinal end 18 of the blade 16, and the second longitudinal end 37 of the retraction spring 32 hookingly engages within a slot 39 formed in the spindle 15 to fix the end 37 of the spring 32. In one embodiment, the spring 32 is a thin, flat ribbon of metal (e.g., the metal being steel).

In one embodiment, the blade 16 is formed of a ribbon of metal (e.g., the metal being steel), and the top concave surface of the blade is printed with measuring lines and digits (not shown) for measuring lengths and distances. The blade 16 is wound on the reel 14 and the distal end of the blade 16 is arranged to extend outwardly through the opening 22 provided in the housing 12 (as shown, for example, in FIG. 3).

The blade or measuring tape 16 is generally movable between a fully retracted position and a fully extended position. The fully retracted position of the blade 16 is shown in FIG. 3 and the fully extended position of the blade is shown (in fragmentary view) in FIG. 4. It can be appreciated from a comparison of FIG. 3 and FIG. 4 that as the blade is unwound from the reel 14, the spring 32 is wound more tightly around the rigidly fixed axle or reel spindle 15. This winding of the spring around the spindle stores energy in the spring to provide spring powered rewinding of the blade 16 around the reel 14 when the extended blade is released.

The blade 16 may be constructed of a ribbon of sheet metal that is shaped during the manufacturing to have a normal or memory configuration that has a generally arcuate or concavo-convex transverse cross-section. When a portion of the blade 16 is wound about the reel 14, the wound portion has a flat transverse cross-section and the wound layers of the coiled blade provide the wound blade with an abutting volute coil configuration. In other words, when the blade 16 is wound around the reel 14, it has the flat cross-section and when the blade 16 is withdrawn from the housing 12 to measure an object, it returns to the concavo-convex cross-section. Thus, the spring 32 is constructed and arranged between the housing 12 (or the spindle 15) and the reel 14 to rotate the reel 14 about the axle or reel spindle 15 in a direction to wind up the elongated blade 16 when extending outwardly of the housing opening 22 in a normal concavo-convex cross-sectional configuration onto the reel 14 in an abutting volute coil formation in a flattened cross-sectional configuration.

In various embodiments, the blade 16 can be of the type described in commonly assigned U.S. Pat. No. 6,324,769, which is hereby incorporated by reference in its entirety. In another embodiment, the blade may not include a concavo-convex cross-section but may include any other cross-sectional configurations.

Figure 2:
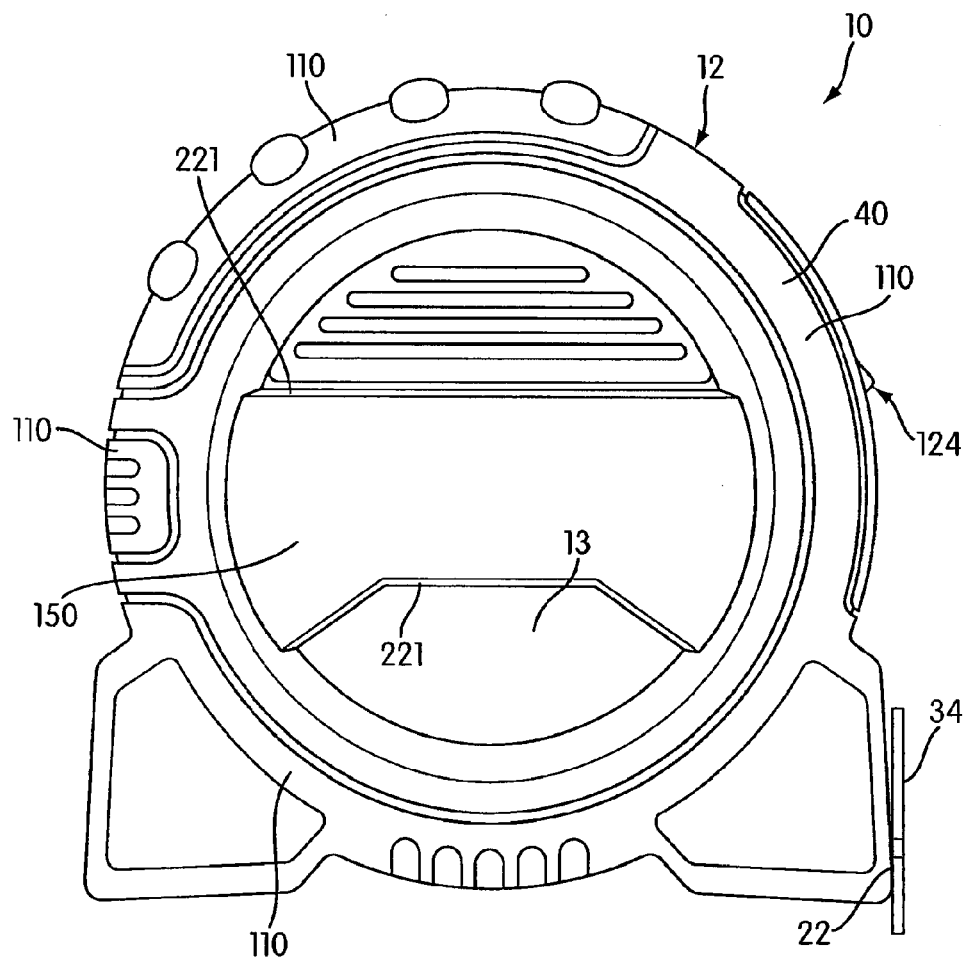
FIG. 2 shows a front view of the tape rule housing of FIG. 1.

The elongated blade 16 has an end hook member 34 (FIGS. 2 and 3) on a free end 20 thereof. The elongated blade 16 is arranged to be wound on the reel 14 and to be extendable through the opening 22 in the housing 12. As shown in FIGS. 1-3, the end hook member 34 is mounted on the free end 20 of the blade 16 with the mounting portion thereof secured in engagement with a concave (upper) side of the free end 20 of the blade 16 and in overlying relation thereto. In one embodiment, the blade hook, for example, may be of the type disclosed in U.S. Patent Application Publication Nos. 2011/0179661 or 2011/0179664, hereby incorporated by reference in their entirety.

In one embodiment, a holding assembly 124 is constructed and arranged to be manually actuated to hold the blade or measuring tape 16 in any position of extension outwardly of the housing opening 22 and to release the blade 16 from any position in which it is held. The structure and operation of the holding assembly 124 is best appreciated from a comparison of FIGS. 3-4. The holding assembly 124 includes a holding member 126 mounted on the housing 12 for movement in opposite directions between a normally inoperative position (FIG. 3) and a holding position (FIG. 4). In one embodiment, the holding assembly 124 can be of the type, for example, described in commonly assigned U.S. Pat. No. 6,324,769, which is hereby incorporated by reference in its entirety.

As noted above, the openings or recesses 153, 154 of the housing members 40, 42 are configured to receive the reinforcement regions 150, 152, respectively. These reinforcement regions 150, 152 are disposed at least at a position at which the axle or reel spindle 15 joins or meets the housing 12. In one embodiment, the reinforcement regions 150, 152 are disposed in the openings 153, 154 of the end walls 44, 46 and are integrally molded into the housing member 40, 42, respectively.

The reinforcement regions 150, 152 are formed from the second material. The second material is a higher impact resistant material than the first material of the housing members 40, 42. In one embodiment, the second material may include polycarbonate material. In another embodiment, the second material may include polycarbonate alloys or polycarbonate resins. In yet another embodiment, the second material may include any other impact resistant materials, for example, such as, polystyrene or acrylate (acrylic) materials. In yet another embodiment, the second material may be any suitable material having impact resistance higher than the first material and that forms a chemical bond with the first material.

Figure 9:
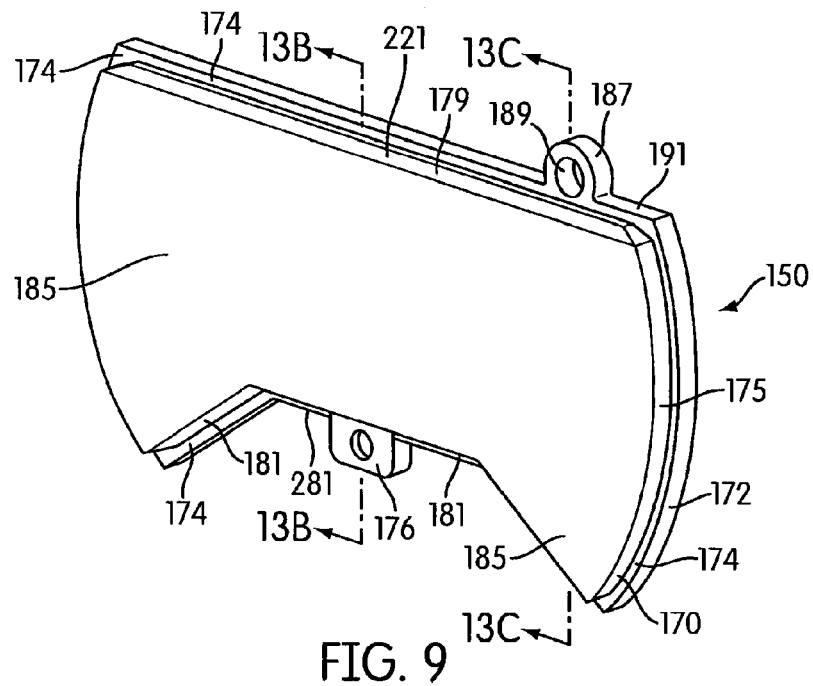
FIG. 9 shows a front perspective view of a reinforcement region of the tape rule housing in accordance with an embodiment of the present disclosure.
Figure 10:
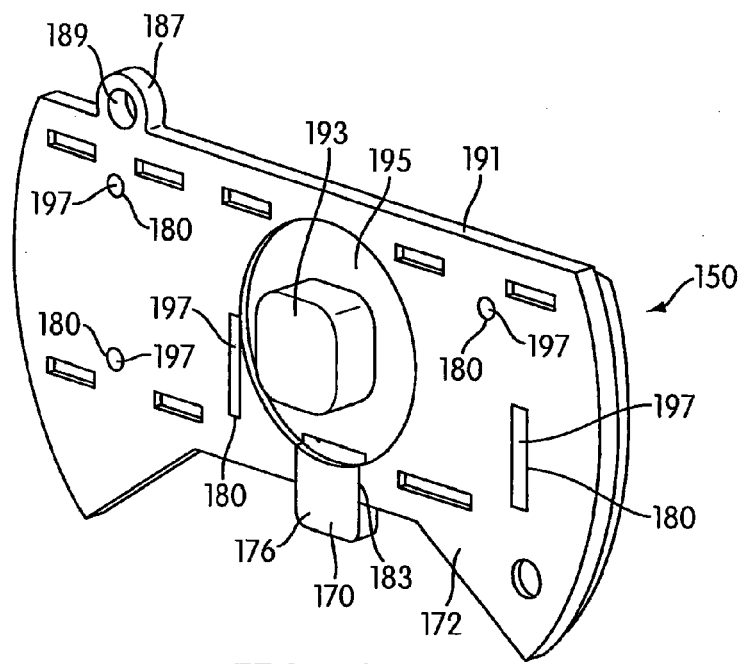
FIG. 10 shows a rear perspective view of the reinforcement region of FIG. 9.
Figure 11:
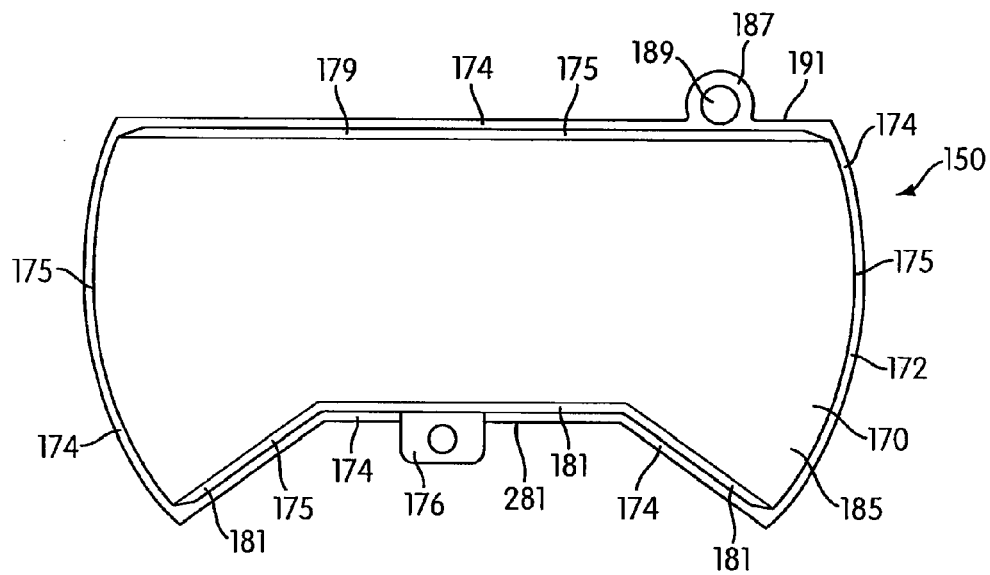
FIG. 11 shows a front view of the reinforcement region of FIG. 9.
Figure 12:
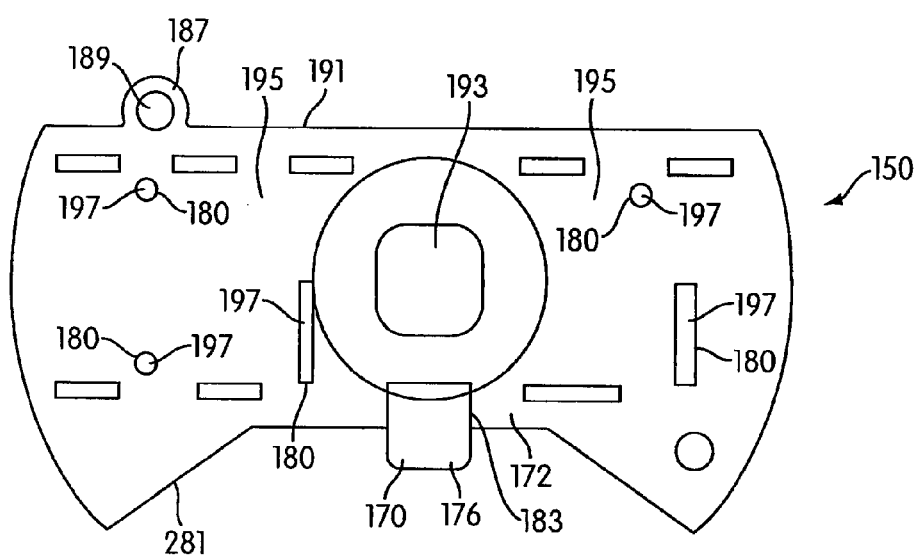
FIG. 12 shows a rear view of the reinforcement region of FIG. 9.
Figure 13A:
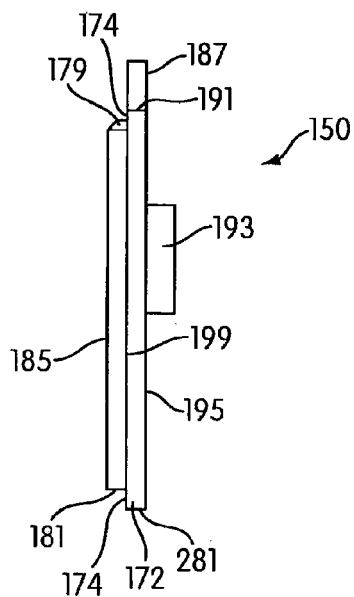
FIG. 13A shows a side view of the reinforcement region of FIG. 9.
Figure 13B:
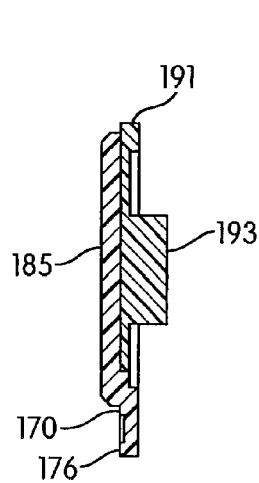
FIG. 13B is a cross-sectional view taken through the line 13B-13B in FIG. 9.
Figure 13C:
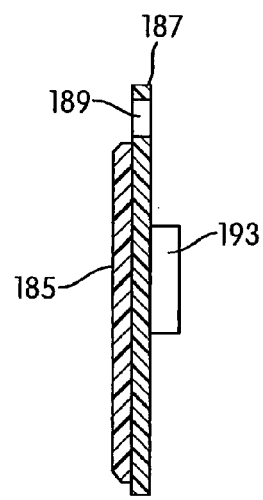
FIG. 13C is a cross-section view taken through the line 13C-13C in FIG. 9.

The reinforcement region 150 in accordance with one embodiment is shown by itself, separated from the rest of the housing 12, in FIGS. 9-13C. Specifically, FIGS. 9 and 10 are front and rear perspective views, FIGS. 11 and 12 are front and rear views, FIG. 13A is a side view of the reinforcement region 150, FIG. 13B is a cross-sectional view taken through line 13B-13B in FIG. 9, and FIG. 13C is a cross-sectional view taken through line 13C-13C in FIG. 9.

Although only one reinforcement region 150 is shown in FIGS. 9-13C, it is to be understood that the other (second) reinforcement region 152 on the other side of the housing can be the mirror image of the reinforcement region (150) that is shown. Accordingly, whereas various features of the reinforcement region 150 are shown and described in FIGS. 9-13C, it is to be understood that mirror images of those features are provided on the other (opposite) reinforcement region 152.

In another embodiment, as shown in FIGS. 6, 14 and 15, the second reinforcement region 152 may have a slightly different construction than that of the first reinforcement region 150. For example, as shown in FIGS. 6 and 14, instead of having a first portion 170 (with its associated display surface 185) and a second portion 172, the reinforcement region 152 may only include the second portion 172. In such embodiment, the clip 77 may be at least partially attached to an outer surface of the reinforcement region 152. The second portion 172, the first portion 170 and the display surface 185 are described in detail below.

As shown in the embodiment of FIGS. 9-13, the reinforcement region 150 may optionally include a first portion 170 and a second portion 172. The first portion 170 is integrally formed or integrally molded with the second portion 172. As will be clear from the discussion below, in another embodiment, the reinforcement region 150 may alternatively formed as a single one-piece construction.

As shown in the illustrated embodiment in FIGS. 1 and 9, at least a portion of the top and bottom edges 179 and 181 of the first portion 170 may be chamfered. In one embodiment, an interface between the other portions of the housing 12 and the reinforcement region 150 is not formed along the chamfered edge portions 221 (see FIGS. 1, 2, 7 and 9). The reinforcement region 150, thus, may have a raised configuration (that is in comparison with the other portions of the housing 12) along these top and bottom edges 179 and 181, when the reinforcement region 150 is integrally formed with the housing 12.

In one embodiment, a display surface 185 of the first portion 170 may have advertising or promotional information such as indicia (not shown) for identifying the product and/or manufacturer to the customers. In one embodiment, the indicia on the surface 185 may take the form of logos, serial numbers, trademarks, brand names, images, emblems, promotional or advertising markings, alphanumeric characters, geometric or decorative patterns, letters, numerals, part numbers, machine readable barcodes, or combinations thereof, just for example. These indicia may be imprinted, embossed or affixed (via adhesive bonding or mechanical fasteners) on the surface 185. In one embodiment, the indicia may be of any color that contrasts with the color of the surface 185 of the first portion 170, thus, providing contrasting color indicia. In one embodiment, the display surface is optional.

In one embodiment, the second portion 172 is constructed and arranged to extend beyond edge portions 175 of the first portion 170 to define surrounding flange portions 174. These outwardly protruding flange portions 174 of the second portion 172 generally surround the entire periphery of the first portion 170. In one embodiment, the outwardly protruding flange portions 174 of the second portion 172 provide mechanical or structural interconnections between the other portions of the housing 12 and the reinforcement region 150.

In one embodiment, these outwardly protruding flange portions 174 are positioned such that the reinforcement region 150 is provided with a stepped configuration. These outwardly protruding flange portions 174 are configured to increase the surface area of an interface between the other materials of the housing 12 and reinforcement region 150 thereby improving the chemical bond and/or structural bond between the first material of the housing 12 and the second material of the reinforcement region 150.

The second portion 172 may also include various openings or recesses 180 that are configured to provide mechanical interlocking connections between the first and the second portions 170 and 172 as the first and the second portions 170 and 172 are being integrally molded or formed. These openings or through holes 180 are constructed and arranged to allow the material of the first portion 170 to flow or pass therethrough during the molding process so as to form mechanical interlocking connections between the first and the second portions 170 and 172. As shown in the illustrated embodiment, these openings or through holes 180 may have any different shapes or sizes to provide mechanical interlocking connections between the first and the second portions 170 and 172 as the first and the second portions 170 and 172 are being integrally molded or formed. This interlocking arrangement is in addition to, or an alternative to, a chemical bond between portions 170 and 172.

In one embodiment, the reinforcement region 150 may include a first connecting portion 176 extending outwardly away from the bottom edge 181 of the first portion 170 and also extending outwardly away from a bottom edge 281 of the second portion 172. In one embodiment, the first connecting portion 176 is integrally formed with the first portion 170. The connecting portion 176 is disposed such that it extends in a different plane than the first portion 170 and lies in the same plane as the second portion 172. That is, the connecting portion 176 is positioned such that it provides a stepped configuration to the reinforcement region 150.

In one embodiment, the connecting portion 176 is constructed and arranged to provide an additional, optional mechanical interlocking connection between the first and the second portions 170 and 172 as the first and the second portions 170 and 172 are being integrally molded or formed. In one embodiment, the second portion 172 may include an opening 183 constructed and arranged to receive the connecting portion 176 therein.

In one embodiment, the connecting portion 176 also provides a mechanical interconnection between the other portions of the housing 12 and the reinforcement region 150 as the housing 12 and the reinforcement region 150 are being connected (e.g., via a molding process in which the formed reinforcement region is placed into a mold cavity and molten first material of the housing 12 is put into the mold cavity to form around and against the reinforcement region so that the two are mechanically and/or chemically secured/bonded together. In one embodiment, the connecting portion 176 is configured to increase the surface area of an interface between the other portions of the housing 12 and the reinforcement region 150 thereby improving the chemical bond and/or structural bond therebetween.

In one embodiment, the first portion 170 may include protruding portions 197 (as shown in FIGS. 10 and 12) disposed on its rear surface 199 (as shown in FIG. 13). These protruding portions 197 configured to provide mechanical interlocking connections between the first and the second portions 170 and 172 as the first and the second portions 170 and 172 are being integrally formed together. Specifically, when the second portion 172 is being molded onto the first portion 170, the material of the second portion 172 at least surrounds protruding portions 197 of the first portion 170 to form mechanical interlocking connections between the first and the second portions 170 and 172.

In one embodiment, the reinforcement region 150 may include a second connecting portion 187 extending outwardly away from a top edge 191 of the second portion 172. The connecting portion 187 is positioned such that it extends in the same plane as the second portion 172.

In one embodiment, the connecting portion 187 is constructed and arranged to provide a mechanical interlocking connection between the other portions of the housing 12 and the reinforcement region 150, as the first material of the housing 12 is formed around the reinforcement region 150 in a molding or other forming process. In the illustrated embodiment, the connecting portion 187 may include an opening 189 therein. The opening 189 may be constructed and arranged to allow the first material of the housing 12 to at least partially flow or pass through the opening 189 during the molding process so as to form a mechanical interlocking connection between the first material of the housing 12 and the reinforcement region 150.

In one embodiment, the opening 189 may be used as a locating hole to locate and/or position the reinforcement region 150 in place in the mold (during the molding of the housing 12 and the reinforcement portion 150). In another embodiment, the opening 189 may be used as a locating hole to locate and/or position the second portion 172 in place in the mold (during the molding of the first portion 170 and the second portion 172).

In one embodiment, the reinforcement region 150 may include the mounting structure 193 protruding away from rear surface 195 of the second portion 172. As explained with respect to FIG. 14, the mounting structure 193 is constructed and arranged to connect the reinforcement portion 150 to the axle or reel spindle 15. The mounting structure 193 is also formed of the second (higher impact resistance) material of the reinforcement region. While in FIG. 14, the spindle 15 is secured in surrounding relation to the mounting structure 193 (in surrounding shape interlocking relation), in another embodiment the spindle 15 may be received in a recess in the mounting structure 193 or bolted or pinned to the mounting structure 193.

The first portion 170 and the second portion 172 of the reinforcement region 150 may be made of polycarbonate or any other impact resistant materials as disclosed above. In one embodiment, the first portion 170 and the second portion 172 may optionally be made from different colored (but same impact resistant) materials. In one embodiment, the indicia formed on the surface 185 of the first portion 170 may be manifest as a result of the different color of the second portion 172 being visible through openings in the first portion 170, wherein such openings take the shape of lettering or other indicia.

In one embodiment, as shown in FIGS. 6 and 14, only the first portion 170 of the reinforcement region 150 is received in the stepped recess 153 of the end wall 44 of the housing 12. In such an embodiment, portions of the housing 12 that are adjacent to the reinforcement region 150 are placed in an overlapping relationship with the outwardly protruding flange portions 174 and with the connecting portion 176.

In one embodiment, the first and second portions 170, 172 of the reinforcement region 150 are formed by injection molding process, such as, insert injection molding or multi-shot (e.g., two-shot) injection molding process to provide the color contrast as mentioned above.

In another embodiment, instead of having the first and second portions 170, 172, the entire reinforcement region 150 may be formed in a single shot mold process as a single one-piece structure. In such an embodiment, the single one-piece portion (formed by the single-shot injection molding) includes the connecting portion 176, the outwardly protruding flange portions 174 and the connecting portion 187 that are constructed and arranged to provide the same mechanical interconnections and/or chemical bonding between the other portions of the housing 12 and the reinforcement region 150 when the first material and the second material are molding one into the other, or otherwise connected.

As noted above, in one embodiment, both the first portion 170 and the second portion 172 are formed or molded using the same (second) material having different colors. In one embodiment, the first portion 170 is pre-formed using a first colored material in a first mold. The pre-formed first portion 170 may include the connecting portion 176 and the protruding portions 197 integrally formed thereon. The pre-formed first portion 170 is then inserted into a second mold. A second colored material is then passed into the second mold such that the second colored material is molded onto the pre-formed first portion 170. The connecting portion 176 and protruding portions 197 of the first portion 170 are optionally configured to provide a mechanical interconnection between the first and the second portions 170 and 172 as the second colored material molds on the inserted first colored material. That is, when the second portion 172 is thus formed, the second colored material of the second portion 172 at least surrounds portions of the pre-formed first portion 170, so that the second portion 172 is integrally formed with the pre-formed first portion 170.

In another optional embodiment, the second portion 172 is pre-formed, and the first portion 170 is then molded onto the pre-formed second portion 172. In such embodiment, the pre-formed second portion 172 includes openings or through holes 180 and 183 that are configured to allow the material of the first portion 170 to flow or pass therethrough during the molding process so as to form a mechanical interconnection between the first and the second portions 170 and 172.

In another optional embodiment, the reinforcement portion 150 may be molded in a two-shot injection molding process performed within a single molding cycle (i.e., without removing the first portion 170 from the mold cavity). In the first procedure of the two-shot injection molding process, the first portion 170 is molded using the second material in a mold. The first portion 170 is allowed to harden in the mold. Then the second material having a different color is injected into the remaining open spaces in the mold such that the different colored, second material is molded onto selective portions of the first portion 170. That is, the different colored, second material flows around the hardened first portion 170 to form the second portion 172. Alternatively, two-shot injection molding may be performed where the second portion 172 is molded and allowed to harden first, and the different colored, second material flows around the hardened second portion 172 to form the first portion 170. Alternatively, the first portion 170 (or the second portion 172) is molded in a first mold cavity removed and cooled, and then placed in a second mold cavity wherein the other portion is molded around it.

In another embodiment, the axle or reel spindle 15 may be integrally molded as part of the reinforcement region 150 using injection molding process, such as, in a single shot injection molding process or multi-shot (e.g., two-shot) injection molding process.

In one embodiment, the reinforcement region 150 is formed using the second material in a first mold. The fully-formed reinforcement region 150 is then inserted into a second mold. The first material is then passed into the second mold such that the first material is molded onto the fully-formed reinforcement region 150. In one embodiment, the first material molds on at least portions of the inserted second material. These portions of the inserted second material may include one or more of the connecting portion 176, the outwardly protruding flange portions 174, and the connecting portion 187 to provide mechanical interconnections between the first material of the housing 12 and the second material of the reinforcement region 150. In another embodiment, the other portions (the first material) of the housing 12 may be molded first and then the reinforcement region may be molded second around or onto the first material.

As noted above, the reinforcement region 150 made of a polycarbonate or other suitable impact resistant material and the housing 12 made of ABS or other material that is of lower impact resistance (and less expensive).

It should be appreciated that the reinforcement region 150 can be of different shapes and sizes than those illustrated. For example, in one embodiment, the reinforcement region is essentially only a region that includes the mounting structure 193, and in another embodiment may include the mounting structure 193 and small portion of the end wall 44. In another embodiment, this smaller reinforcement region (second material) may be molded with the spindle. The spindle may be a rigid structure (e.g., metal) that is inserted into a mold cavity, with the reinforcement region molded around it, or in another embodiment the spindle may be integrally molded as one piece with the mounting structure 193 and/or reinforcement region.

In one embodiment, the reinforcement region 150 (made of the higher impact resistant material) can remain in a lower mold cavity and allowed to cool, and then a second shot of the lower impact material is molded on top of the reinforcement region (typically with a different upper mold cavity than that used in the first mold process for the reinforcement region).

In one embodiment, the first material and the second material are held together purely by a chemical bond, without any mechanical interconnections. In one embodiment, the various properties (e.g., pressure, temperature, etc.) of the injection molding process may controlled (i.e., during the injection molding process) to facilitate a chemical bond between the housing 12 and the reinforcement region 150.

One skilled in the art will understand that the embodiment of the rule assembly 10 shown in the figures and described above is exemplary only and not intended to be limiting. It is within the scope of the present disclosure to provide any known rule assembly with any or all of the features of the present disclosure. For example, the housing constructed according to the principles of the present disclosure can be applied to any known rule assembly.

Two or more dissimilar (structural) materials improve the strength of the tape rule housing. Two or more dissimilar (structural) materials provide enhanced or improved impact protection to the tape rule housing.

Although the present disclosure has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment can be combined with one or more features of any other embodiment.

What is claimed is:

1. A tape rule assembly comprising:
a housing comprising a first material;
a reel rotatable within the housing;

an axle extending within the housing about which the reel is mounted;
a measuring tape wound on the reel;
a reinforcement region comprising a portion of the housing and closing off an opening in the housing that is axially aligned with the axle, the reinforcement region formed from a second material comprising a higher impact resistance material than the first material of the housing;
the second material disposed at least at the position at which the axle joins the housing.

2. The rule assembly of claim 1, wherein the second material is a polycarbonate material.

3. The rule assembly of claim 1, wherein the first material is an Acrylonitrile butadiene styrene (ABS) material.

4. The rule assembly of claim 1, wherein the reinforcement region constructed and arranged to provide mechanical interlocking connections between the first material and the second material.

5. The rule assembly of claim 1, further comprising plating material deposited on the first material of the housing.

6. The rule assembly of claim 1, wherein the second material is of a different material than the material of the axle.

7. The rule assembly of claim 6, wherein the material of the axle is metal.

8. The rule assembly of claim 6, wherein the second material is a polycarbonate material.

9. The rule assembly of claim 1, wherein the reinforcement region includes a first portion and a second portion that is constructed and arranged to extend beyond edge portions of the first portion to define surrounding flange portions.

10. The rule assembly of claim 9, wherein the flange portions of the second portion surround the entire periphery of the first portion and are constructed and arranged to provide mechanical or structural interconnections between the first material of the housing and the second material of the reinforcement region.

11. The rule assembly of claim 9, wherein the flange portions of the second portion extend in a different plane than the first portion such that they provide a stepped configuration to the reinforcement region to increase the surface area of an interface between the first material of the housing and the second material of the reinforcement region thereby improving a chemical bond and/or structural bond between the first material of the housing and the second material of the reinforcement region.

12. The rule assembly of claim 1, wherein the reinforcement region includes connecting portions that are constructed and arranged to provide mechanical interlocking connections between the first material of the housing and the second material of the reinforcement region.

13. The rule assembly of claim 12, wherein one of the connecting portions includes an opening therein, the opening is constructed and arranged to allow the first material of the housing to at least partially flow or pass therethrough during molding of the first material of the housing and the second material of the reinforcement region so as to form the mechanical interlocking connections between the first material of the housing and the second material of the reinforcement region.

14. A tape rule assembly comprising:
a housing comprising a first material;
a reel rotatable within the housing;
an axle extending within the housing about which the reel is mounted;
a measuring tape wound on the reel;
a reinforcement region comprising a portion of the housing, the reinforcement region formed from a second material comprising a higher impact resistance material than the first material of the housing;
the second material disposed at least at a position at which the axle joins the housing, and wherein the axle is formed from the second material and is integrally molded as one piece with the reinforcement region.

15. A tape rule assembly comprising:
a housing comprising a first material;
a reel rotatable within the housing;
an axle extending within the housing about which the reel is mounted;
a measuring tape wound on the reel;
a reinforcement region comprising a portion of the housing, the reinforcement region formed from a second material comprising a higher impact resistance material than the first material of the housing;
the second material disposed at least at a position at which the axle joins the housing, and wherein the second material of the reinforcement region comprises a mounting structure, and wherein the axle is separately formed from and joined to the mounting structure.

16. A tape rule assembly comprising:
a housing comprising a first material;
a reel rotatable within the housing;
an axle extending within the housing about which the reel is mounted;
a measuring tape wound on the reel;
a reinforcement region comprising a portion of the housing, the reinforcement region formed from a second material comprising a higher impact resistance material than the first material of the housing;
the second material disposed at least at a position at which the axle joins the housing, and wherein the second material is integrally formed with the first material through a chemical bond across an interface between the first material and the second material.

17. A tape rule assembly comprising:
a housing comprising a first material;
a reel rotatable within the housing;
an axle extending within the housing about which the reel is mounted;
a measuring tape wound on the reel;
a reinforcement region comprising a portion of the housing, the reinforcement region formed from a second material comprising a higher impact resistance material than the first material of the housing;
the second material disposed at least at a position at which the axle joins the housing, and wherein the second material of the reinforcement region and the first material of the housing are connected to one another by a molded connection.

18. The rule assembly of claim 17, wherein the molded connection comprises a mechanical interlock connection.

19. The rule assembly of claim 17, wherein the molded connection comprises a chemical bond between the first and second materials.

20. A tape rule assembly comprising:
a housing comprising a first material;
a reel rotatable within the housing;
an axle extending within the housing about which the reel is mounted;
a measuring tape wound on the reel;
a reinforcement region comprising a portion of the housing, the reinforcement region formed from a second material comprising a higher impact resistance material than the first material of the housing;

the second material disposed at least at a position at which the axle joins the housing, wherein the second material is of a different material than the material of the axle, wherein the second material is a polycarbonate material, and wherein the position at which the axle joins the housing is at a portion of the second material that is adjacent the axle.

\* \* \* \* \*